(12) United States Patent
Schleuter et al.

(10) Patent No.: US 10,386,254 B2
(45) Date of Patent: Aug. 20, 2019

(54) FASTENER STATUS DETECTION SYSTEM

(71) Applicant: The Boeing Company, Chicago, IL (US)

(72) Inventors: Lisa G. Schleuter, Mukilteo, WA (US); Kevin Christopher Klohe, Shoreline, WA (US); Bret Alan Bowers, Freeland, WA (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 15/137,366

(22) Filed: Apr. 25, 2016

(65) Prior Publication Data

US 2017/0305529 A1     Oct. 26, 2017

(51) Int. Cl.
*G01L 5/00* (2006.01)
*B64C 9/02* (2006.01)
*B64D 45/00* (2006.01)

(52) U.S. Cl.
CPC .............. *G01L 5/0047* (2013.01); *B64C 9/02* (2013.01); *B64D 2045/0085* (2013.01); *Y02T 50/44* (2013.01)

(58) Field of Classification Search
CPC ....... B64C 9/02; G01L 5/0028; G01L 5/0033; G01L 5/0038; G01L 5/0042; G01L 5/0047; G01L 5/0061; G01N 2291/02827; F16B 31/021–028
USPC .................................... 73/862–862.382, 761
See application file for complete search history.

(56) References Cited

U.S. PATENT DOCUMENTS

| 3,913,396 | A  | * | 10/1975 | Elliot ...................... B63B 21/00 114/230.21 |
| 4,805,451 | A  | * | 2/1989  | Leon ....................... G01B 7/16 73/168 |
| 4,879,511 | A  | * | 11/1989 | Leon ....................... G01B 7/16 324/163 |
| 4,879,901 | A  | * | 11/1989 | Leon ....................... G01B 7/16 73/168 |
| 4,882,937 | A  | * | 11/1989 | Leon ....................... G01B 7/16 73/862.628 |
| 5,469,737 | A  | * | 11/1995 | Smith ..................... G01L 5/0061 137/552 |
| 6,483,047 | B1 | * | 11/2002 | Zaharia .................. G01G 19/18 177/142 |
| 7,945,425 | B2 | * | 5/2011  | Marx .................. B64D 45/0005 244/213 |
| 8,115,649 | B2 |   | 2/2012  | Moy et al. |
| 9,573,797 | B1 | * | 2/2017  | Beck ..................... B66F 17/006 |
| 9,816,884 | B2 | * | 11/2017 | Gerber .................. G01L 5/0061 |
| 9,874,485 | B2 | * | 1/2018  | McCormick ........ F16K 37/0041 |
| 2009/0116909 | A1 | * | 5/2009 | Danskine .................. B63B 3/08 405/219 |
| 2010/0100355 | A1 | * | 4/2010 | Marx ................. B64D 45/0005 702/183 |

(Continued)

*Primary Examiner* — Peter J Macchiarolo
*Assistant Examiner* — Nathaniel J Kolb
(74) *Attorney, Agent, or Firm* — Yee & Associates, P.C.

(57) ABSTRACT

A fastener status detection system is presented. The fastener status detection system comprises a primary fastener, a secondary fastener, and a sensor. The secondary fastener is configured to be a back-up to the primary fastener. The sensor is positioned to measure at least a portion of a load between the primary fastener and the secondary fastener.

20 Claims, 7 Drawing Sheets

(56) References Cited

U.S. PATENT DOCUMENTS

| | | | | |
|---|---|---|---|---|
| 2012/0095702 A1* | 4/2012 | Baird | ............... | B64C 25/00 |
| | | | | 702/42 |
| 2015/0082902 A1* | 3/2015 | McCormick | ........ | F16K 37/0041 |
| | | | | 73/841 |
| 2015/0346043 A1* | 12/2015 | Kohuth | ............ | G01L 5/0028 |
| | | | | 73/818 |
| 2016/0288921 A1* | 10/2016 | Padilla | ............... | B64C 9/00 |
| 2016/0305834 A1* | 10/2016 | Gerber | ............ | G01L 5/0061 |

* cited by examiner

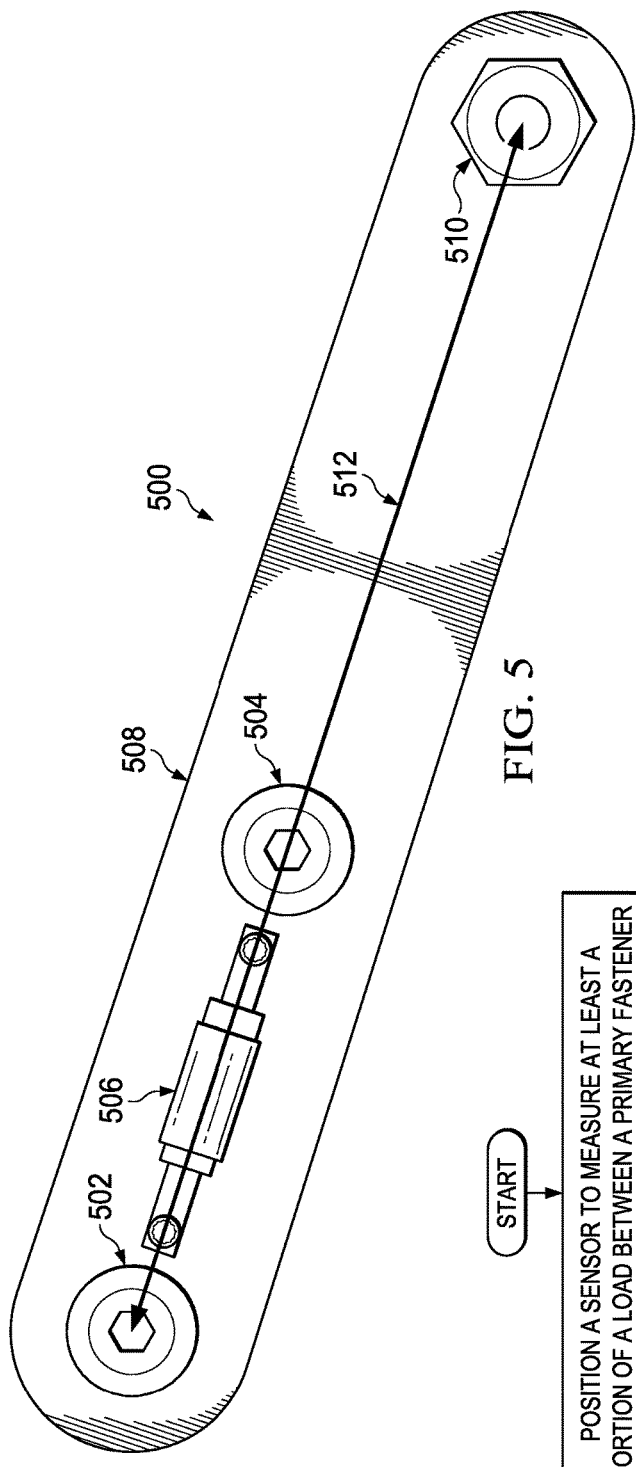

FASTENER STATUS DETECTION SYSTEM

BACKGROUND INFORMATION

1. Field

The present disclosure relates generally to fasteners, and in particular, to fasteners having backups. Still more particularly, the present disclosure relates to a status detection system for a fastener.

2. Background

Fasteners are used to join two components together. Some fasteners may be redundant. For example, primary fasteners will be installed near backup, or secondary fasteners. In the event that a primary fastener breaks during use, the backup fastener will act to hold the two components together.

Detecting a broken fastener is often more difficult than desired. For example, some fasteners are positioned within large platforms and hidden from view. As another example, even when a fastener is visible, a break within the fastener may be within the two components and not visible. Therefore, it would be desirable to have a method and apparatus that takes into account at least some of the issues discussed above, as well as other possible issues.

SUMMARY

In one illustrative embodiment, a fastener status detection system is presented. The fastener status detection system comprises a primary fastener, a secondary fastener, and a sensor. The secondary fastener is configured to be a back-up to the primary fastener. The sensor is positioned to measure at least a portion of a load between the primary fastener and the secondary fastener.

In another illustrative embodiment, a method is presented. A sensor is positioned to measure at least a portion of a load between a primary fastener and a secondary fastener configured to be a back-up to the primary fastener. A measurement is generated using the sensor. A difference is determined between the measurement and a standard.

In yet another illustrative embodiment, an assembly is presented. The assembly comprises a first component, a second component, and a sensor. The first component is connected to a structural link using a primary fastener and a secondary fastener. The second component is connected to the structural link using a connector. The sensor is associated with the structural link and positioned to measure at least a portion of a load through the structural link between the primary fastener and the secondary fastener.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a fastener status detection system in accordance with an illustrative embodiment;

FIG. 6 is an illustration of a flowchart of a method for detecting fastener status in accordance with an illustrative embodiment;

DETAILED DESCRIPTION

The different illustrative embodiments recognize and take into account one or more different considerations. For example, the illustrative embodiments recognize and take into account that flight control surfaces on an aircraft are used to maneuver and control the altitude of an aircraft. An aircraft may have many types of flight control surfaces. These flight control surfaces include, for example, ailerons, elevators, rudders, spoilers, flaps, slats, airbrakes, and other suitable control surfaces. Flight control surfaces may be driven between an extended and a retracted position using an actuator system.

The illustrative embodiments recognize and take into account that fasteners associated with control surface systems have dual fasteners as a failsafe. For example, currently, dual pins are used in primary flap supports. The illustrative embodiments recognize and take into account that current detection methods may be undesirably heavy. Further, the illustrative embodiments recognize and take into account that current detection methods may be undesirably unreliable. Specifically, current detection methods include mechanical methods that may be affected by external weather, debris, and reliability of the mechanical components.

For example, currently a spring loaded door may be activated to warn of a pin failure on a primary flap support. However, the door may be less visible or less reliable than desired. Further, the illustrative embodiments recognize and take into account that there is no secondary system to determine whether the spring loaded door has been inadvertently activated.

Figure 1:
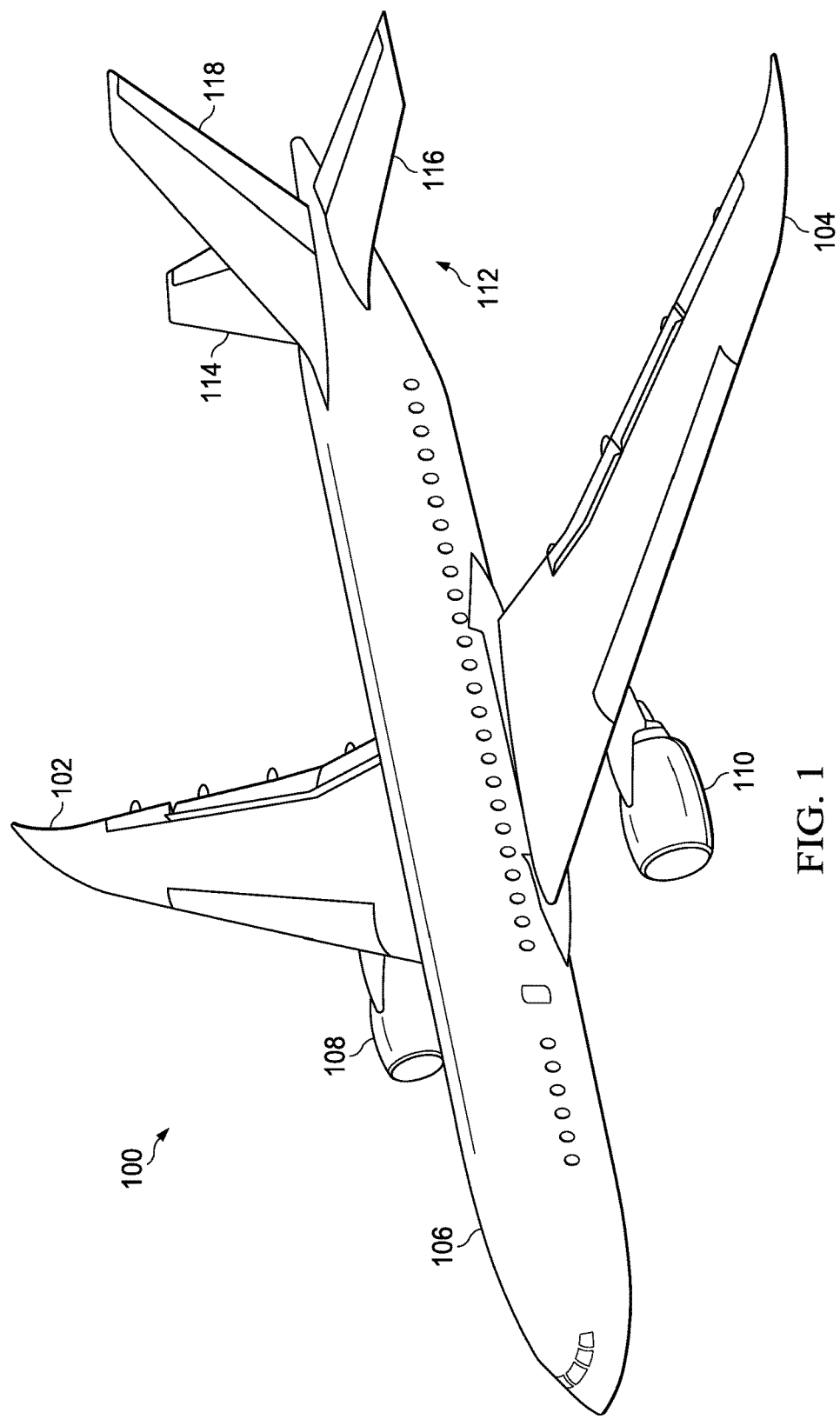
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Aircraft 100 is an example of an aircraft having a fastener status detection system in accordance with an illustrative embodiment. For example, flight control surfaces on at least one of wing 102 or wing 104 may use a fastener status detection system.

As used herein, the phrase "at least one of," when used with a list of items, means different combinations of one or more of the listed items may be used, and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a manufacturing facility, a building, or other suitable platforms.

Figure 2:
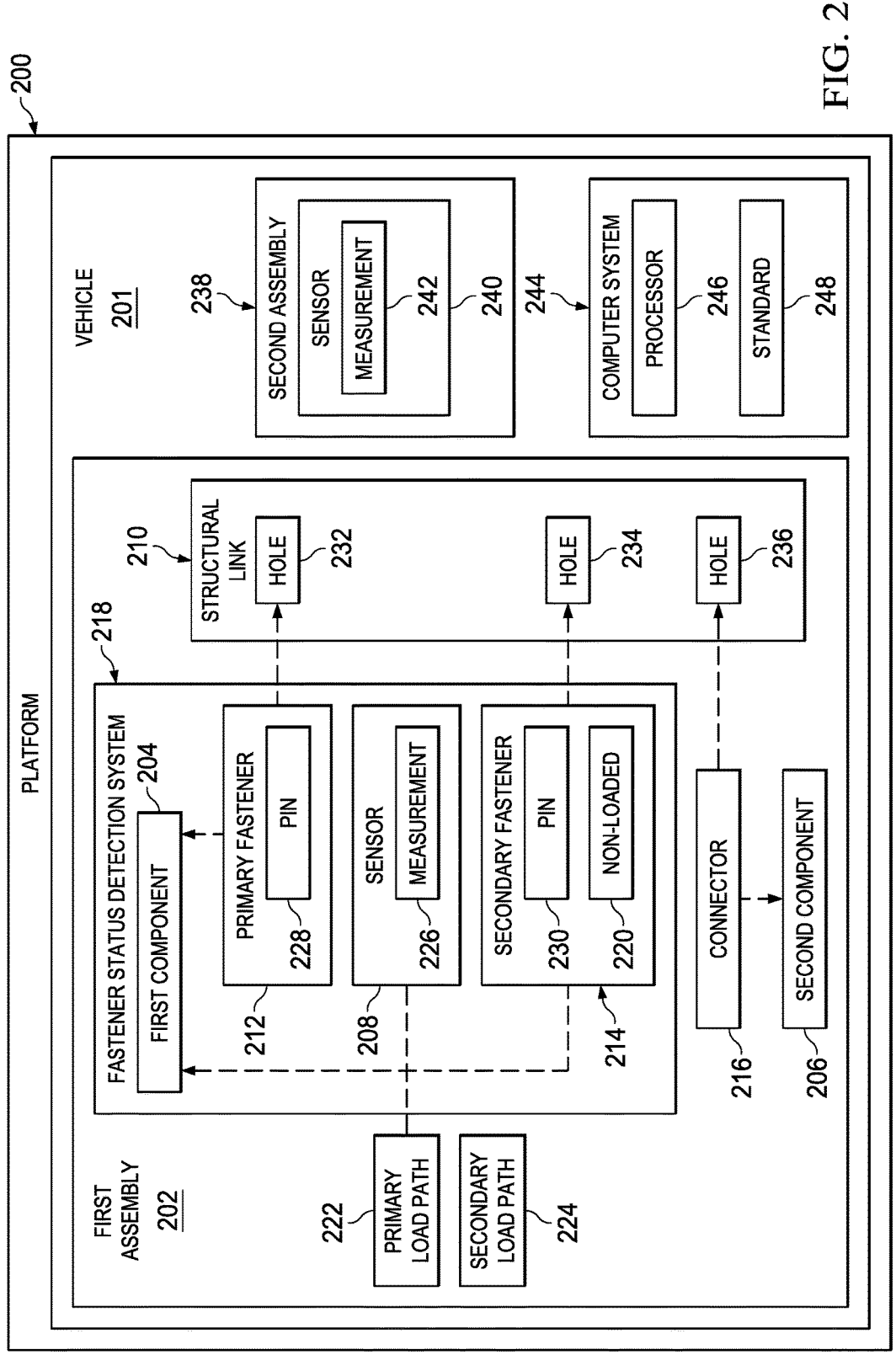
FIG. 2 is an illustration of a block diagram of a platform in accordance with an illustrative embodiment.

With reference now to FIG. 2, an illustration of a block diagram of a platform is depicted in accordance with an illustrative embodiment. In FIG. 2, platform 200 may be one implementation of the aircraft 100 in FIG. 1. In some illustrative examples, platform 200 may take the form of vehicle 201.

As depicted, first assembly 202 of platform 200 includes first component 204, second component 206, and sensor 208. First component 204 is connected to structural link 210 using primary fastener 212 and secondary fastener 214. Second component 206 is connected to structural link 210 using connector 216. Sensor 208 is associated with structural link 210 and positioned to measure at least a portion of a load through structural link 210 between primary fastener 212 and secondary fastener 214.

Fastener status detection system 218 includes primary fastener 212, secondary fastener 214, and sensor 208. Secondary fastener 214 is configured to be a back-up to primary fastener 212. Sensor 208 is positioned to measure at least a portion of a load between primary fastener 212 and secondary fastener 214.

In some illustrative examples, sensor 208 is positioned substantially parallel to the load between primary fastener 212 and secondary fastener 214. In some illustrative examples, sensor 208 is positioned between primary fastener 212 and secondary fastener 214. In some illustrative examples, at least a portion of sensor 208 is positioned between a first line that intersects a center axis of primary fastener 212 and a second line that intersects a center axis of secondary fastener 214. The first line is substantially perpendicular to both the load between primary fastener 212 and secondary fastener 214 and to the center axis of primary fastener 212. The second line is substantially perpendicular to both the load between primary fastener 212 and secondary fastener 214 and to the center axis of secondary fastener 214.

In some examples, sensor 208 is at least one of a strain gauge or a linear variable differential transformer. Sensor 208 is configured to detect at least one of tension or compression.

Secondary fastener 214 does not carry a load when primary fastener 212 is functioning. Thus, secondary fastener 214 is non-loaded 220 during normal functioning. When primary fastener 212 is functioning, the load extends through primary load path 222. Primary load path 222 extends from connector 216 to primary fastener 212.

When primary fastener 212 is not functioning, the load extends through secondary load path 224. Secondary load path 224 extends from connector 216 to secondary fastener 214. The load is at least one of tension or compression. When primary fastener 212 is not functioning, the load does not extend to primary fastener 212.

Sensor 208 takes measurement 226 of at least a portion of the load between primary fastener 212 and secondary fastener 214. When primary fastener 212 is functioning, measurement 226 will be greater than when primary fastener 212 is not functioning. For example, when primary fastener 212 is not functioning, measurement 226 is a half of the value or less of a measurement when primary fastener 212 is functioning. As another example, measurement 226 may be substantially zero when primary fastener 212 is not functioning.

In some illustrative examples, primary fastener 212 takes the form of pin 228. In some further examples, pin 228 is a fuse pin. In some illustrative examples, secondary fastener 214 takes the form of pin 230. In some further examples, pin 230 is a fuse pin.

To connect first component 204 to structural link 210, primary fastener 212 extends through hole 232 and secondary fastener 214 extends through hole 234 in structural link 210. Connector 216 connects second component 206 by extending through hole 236 of structural link 210.

Platform 200 further includes second assembly 238. Second assembly 238 may be substantially the same as first assembly 202. Second assembly 238 has sensor 240 that takes measurement 242. Sensor 240 is positioned within second assembly 238 in a substantially similar way as sensor 208 within first assembly 202. Sensor 240 is positioned to measure at least a portion of a second load between a second primary fastener and a second secondary fastener of second assembly 238.

Platform 200 also includes computer system 244. Computer system 244 includes processor 246 configured to compare measurement 226 from sensor 208 to standard 248. Standard 248 is an expected value when primary fastener 212 is functioning.

A difference between measurement 226 from sensor 208 and standard 248 is determined. If the difference is below a set threshold, primary fastener 212 is determined to be functioning. If the difference is above a set threshold, primary fastener 212 may not be functioning. An alert or other indication may be provided when the difference is above a set threshold.

When the difference between measurement 226 and standard 248 is above a threshold, measurement 226 may be compared to measurement 242. Because sensor 240 is positioned substantially the same as sensor 208, sensor 240 may be used for a confirmation of measurement accuracy of sensor 208. Sensor 240 may act as a check in a number of checks to reduce or eliminate false positives for detecting when primary fastener 212 stops functioning.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although processor 246 is shown as separate from fastener status detection system 218, in other examples, processor 246 may be a component of fastener status detection system 218. As another example, although only two sensors are shown, any quantity of sensors may be present. For example, each dual fastener system in platform 200 may have an associated fastener status detection system.

Figure 3:
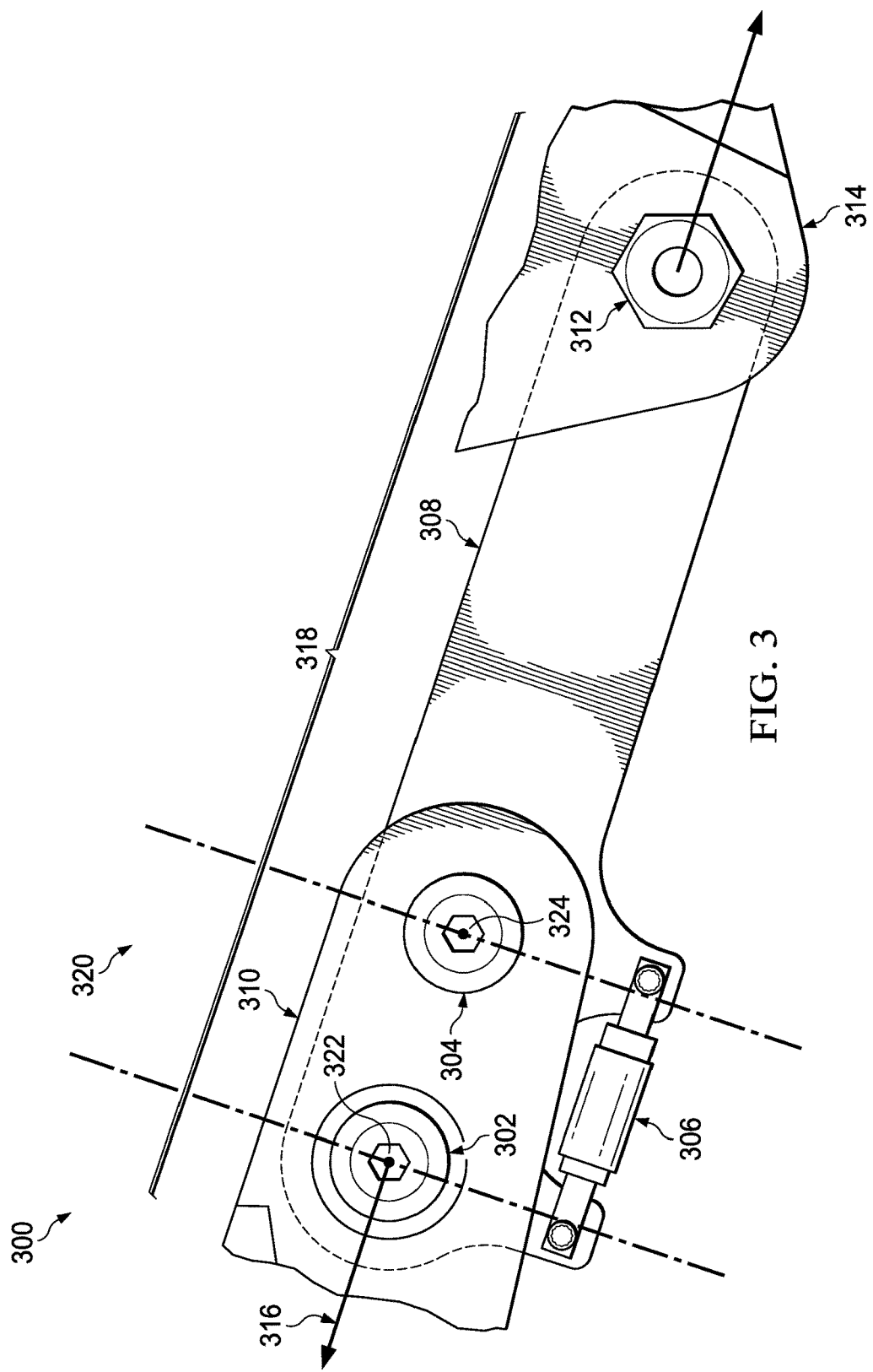
FIG. 3 is an illustration of a fastener status detection system in accordance with an illustrative embodiment.

Turning now to FIG. 3, an illustration of a fastener status detection system is depicted in accordance with an illustrative embodiment. Fastener status detection system 300 is an example of a detection system used in aircraft 100 of FIG. 1. Fastener status detection system 300 is a physical implementation of fastener status detection system 218 of FIG. 2.

Fastener detection system 300 includes primary fastener 302, secondary fastener 304, and sensor 306. Secondary fastener 304 is a back-up for primary fastener 302. Primary fastener 302 and secondary fastener 304 extend through structural link 308 and first component 310. Connector 312 connects second component 314 to structural link 308.

As depicted, load 316 on structural link 308 is a tension load. As depicted, primary fastener 302 is functioning. As a result, load 316 is carried by primary fastener 302 and connector 312. More specifically, load 316 goes through primary load path 318.

As depicted, sensor 306 is positioned substantially parallel to load 316. Further, sensor 306 is positioned substantially parallel to a portion of primary load path 318 between primary fastener 302 and secondary fastener 304. As depicted, sensor 306 is not positioned directly between primary fastener 302 and secondary fastener 304. However, at least a portion of sensor 306 is positioned in area 320 defined between a first line, substantially perpendicular to both load 316 and center axis 322 of primary fastener 302, that intersects center axis 322 and a second line, substantially perpendicular to both load 316 and center axis 324 of secondary fastener 304, that intersects center axis 324.

Measurements taken by sensor 306 in FIG. 3 would be compared to a standard. When primary fastener 302 is functioning, the difference between measurements taken by sensor 306 and a standard should be below a threshold. When the difference between the measurements taken by sensor 306 and a standard is below the threshold, the primary fastener 302 is determined to be functioning.

Figure 4:
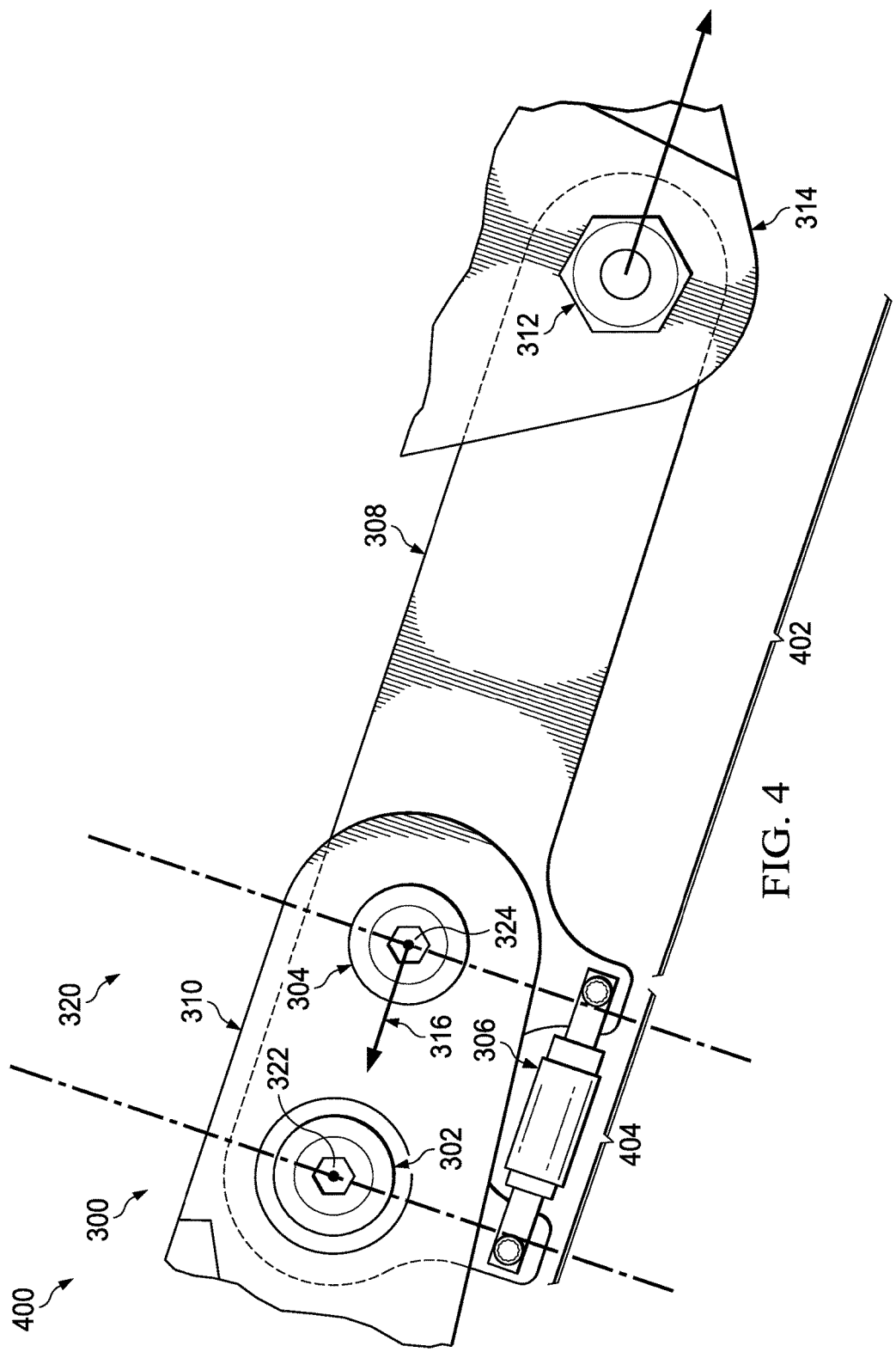
FIG. 4 is an illustration of a fastener status detection system in accordance with an illustrative embodiment.

Turning now to FIG. 4, an illustration of a fastener status detection system is depicted in accordance with an illustrative embodiment. View 400 is a view of fastener detection system 300 of FIG. 3 when primary fastener 302 is not functioning.

In view 400, primary fastener 302 is not functioning. Load 316 is carried by secondary fastener 304 and connector 312. Load 316 travels through secondary load path 402. Portion 404 of primary load path 318 of FIG. 3 does not carry load in FIG. 4.

Measurements taken by sensor 306 in FIG. 4 will be significantly lower than measurements taken by sensor 306 in FIG. 3. Thus, a status of primary fastener 302 is determined using measurements from sensor 306. In some examples, measurements from sensor 306 are compared to each other throughout use of sensor 306, for example during a flight. In another example, measurements from sensor 306 are compared to a standard. In yet another example, measurements from sensor 306 are compared to measurements taken from other sensors with substantially the same positioning.

Turning now to FIG. 5, an illustration of a fastener status detection system is depicted in accordance with an illustrative embodiment. Fastener status detection system 500 is an example of a detection system used in aircraft 100 of FIG. 1. Fastener status detection system 500 is a physical implementation of fastener status detection system 218 of FIG. 2.

Fastener status detection system 500 includes primary fastener 502, secondary fastener 504, and sensor 506. Secondary fastener 504 is a back-up for primary fastener 502. Primary fastener 502 and second fastener 504 extend through structural link 508. Primary fastener 502 and secondary fastener 504 connect a first component (not depicted) to structural link 508. Connector 510 connects a second component (not depicted) to structural link 508.

A load on structural link 508 may be at least one of a tension load or a compression load. Sensor 506 is configured to detect at least one of a tension load or a compression load. As depicted, sensor 506 is positioned substantially parallel to a load traveling through structural link. Sensor 506 is positioned substantially parallel to a portion of primary load path 512 between primary fastener 502 and secondary fastener 504. As depicted, sensor 506 is positioned directly between primary fastener 502 and secondary fastener 504. As depicted, sensor 506 is positioned within the primary load path. Although the whole of sensor 506 is positioned within the primary load path, in other examples, sensor 506 may have alternative locations.

Measurements taken by sensor 506 in FIG. 5 would be compared to a standard. When primary fastener 502 is functioning, the difference between measurements taken by sensor 506 and a standard should be below a threshold. When the difference between the measurements taken by sensor 506 and a standard is below the threshold, the primary fastener 502 is determined to be functioning.

The different components shown in FIG. 1 and FIGS. 3-5 may be combined with components in FIG. 2, used with components in FIG. 2, or a combination of the two. Additionally, some of the components in FIG. 1 and FIGS. 3-5 may be illustrative examples of how components shown in block form in FIG. 2 can be implemented as physical structures.

Turning now to FIG. 6, an illustration of a flowchart of a method for detecting fastener status is depicted in accordance with an illustrative embodiment. Process 600 positions a sensor to measure at least a portion of a load between a primary fastener and a secondary fastener configured to be a back-up to the primary fastener (operation 602).

In some illustrative examples, the primary fastener and the secondary fastener extend through a structural link, and positioning the sensor comprises attaching the sensor to the structural link. In some illustrative examples, positioning the sensor comprises positioning at least a portion of the sensor between a first line that intersects a center axis of the primary fastener and a second line that intersects a center axis of the secondary fastener. The first line is substantially perpendicular to both: the load between the primary fastener and the secondary fastener, and to the center axis of the primary fastener. The second line is substantially perpendicular to both: the load between the primary fastener and the secondary fastener, and to the center axis of the secondary fastener.

Process 600 generates a measurement using the sensor (operation 604). Process 600 determines a difference between the measurement and a standard (operation 606). Afterwards the process terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 600 may further determine if the difference between the measurement and the standard is greater than a threshold and send an alert if the difference between the measurement and the standard is greater than the threshold. The alert may be an immediate alert, such as an alert on a display. In other examples, the alert may be a recorded entry in a log such as a maintenance log.

In another example, process 600 determines if the difference between the measurement and the standard is greater than a threshold. In this example, process 600 also determines a difference between the measurement and a second measurement from a second sensor positioned to measure at least a portion of a second load between a second primary fastener and a second secondary fastener. The second sensor may be in a different location on the same platform. For example, on an aircraft, the second sensor may be on a left wing if the first sensor is on the right wing. In another example, the second sensor may be part of a second portion of the same component. For example, on an aircraft, both the first sensor and the second sensor may be associated with the same flight control surface.

In one illustrative example, process 600 determines a difference between the measurement and a second measurement from a second sensor positioned to measure at least a portion of a second load between a second primary fastener and a second secondary fastener. In an example, process 600 also determines if the difference between the measurement and the second measurement is over a threshold and sends an alert if the difference between the measurement and the second measurement is over the threshold.

Figure 7:
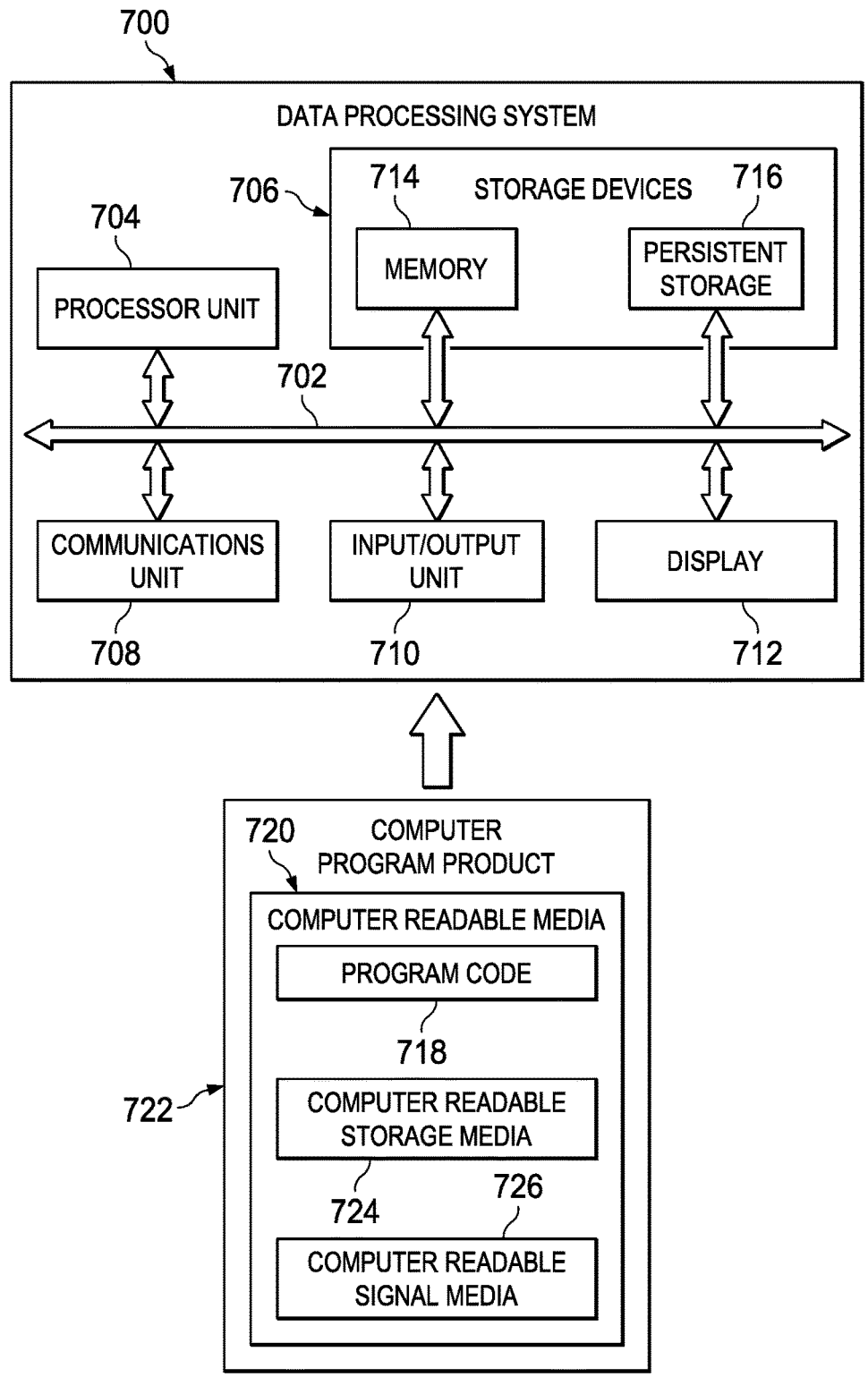
FIG. 7 is an illustration of a data processing system in the form of a block diagram in accordance with an illustrative embodiment.

Turning now to FIG. 7, an illustration of a data processing system in the form of a block diagram is depicted in accordance with an illustrative embodiment. Data processing system 700 may be used to implement processor 246 of FIG. 2. Data processing system 700 may be used to process data, such as measurements from sensor 306 of FIG. 3 or sensor 506 of FIG. 5. As depicted, data processing system 700 includes communications framework 702, which provides communications between processor unit 704, storage devices 706, communications unit 708, input/output unit 710, and display 712. In some cases, communications framework 702 may be implemented as a bus system.

Processor unit 704 is configured to execute instructions for software to perform a number of operations. Processor unit 704 may comprise a number of processors, a multiprocessor core, and/or some other type of processor, depending on the implementation. In some cases, processor unit 704 may take the form of a hardware unit, such as a circuit system, an application specific integrated circuit (ASIC), a programmable logic device, or some other suitable type of hardware unit.

Instructions for the operating system, applications, and/or programs run by processor unit 704 may be located in storage devices 706. Storage devices 706 may be in communication with processor unit 704 through communications framework 702. As used herein, a storage device, also referred to as a computer readable storage device, is any piece of hardware capable of storing information on a temporary and/or permanent basis. This information may include, but is not limited to, data, program code, and/or other information.

Memory 714 and persistent storage 716 are examples of storage devices 706. Memory 714 may take the form of, for example, a random access memory or some type of volatile or non-volatile storage device. Persistent storage 716 may comprise any number of components or devices. For example, persistent storage 716 may comprise a hard drive, a flash memory, a rewritable optical disk, a rewritable magnetic tape, or some combination of the above. The media used by persistent storage 716 may or may not be removable.

Communications unit 708 allows data processing system 700 to communicate with other data processing systems and/or devices. Communications unit 708 may provide communications using physical and/or wireless communications links.

Input/output unit 710 allows input to be received from and output to be sent to other devices connected to data processing system 700. For example, input/output unit 710 may allow user input to be received through a keyboard, a mouse, and/or some other type of input device. As another example, input/output unit 710 may allow output to be sent to a printer connected to data processing system 700.

Display 712 is configured to display information to a user. Display 712 may comprise, for example, without limitation, a monitor, a touch screen, a laser display, a holographic display, a virtual display device, and/or some other type of display device.

In this illustrative example, the processes of the different illustrative embodiments may be performed by processor unit 704 using computer-implemented instructions. These instructions may be referred to as program code, computer usable program code, or computer readable program code, and may be read and executed by one or more processors in processor unit 704.

In these examples, program code 718 is located in a functional form on computer readable media 720, which is selectively removable, and may be loaded onto or transferred to data processing system 700 for execution by processor unit 704. Program code 718 and computer readable media 720 together form computer program product 722. In this illustrative example, computer readable media 720 may be computer readable storage media 724 or computer readable signal media 726.

Computer readable storage media 724 is a physical or tangible storage device used to store program code 718, rather than a medium that propagates or transmits program code 718. Computer readable storage media 724 may be, for example, without limitation, an optical or magnetic disk or a persistent storage device that is connected to data processing system 700.

Alternatively, program code 718 may be transferred to data processing system 700 using computer readable signal media 726. Computer readable signal media 726 may be, for example, a propagated data signal containing program code 718. This data signal may be an electromagnetic signal, an optical signal, and/or some other type of signal that can be transmitted over physical and/or wireless communications links.

The illustration of data processing system 700 in FIG. 7 is not meant to provide architectural limitations to the manner in which the illustrative embodiments may be implemented. The different illustrative embodiments may be implemented in a data processing system that includes components in addition to or in place of those illustrated for data processing system 700. Further, components shown in FIG. 7 may be varied from the illustrative examples shown.

Figure 8:
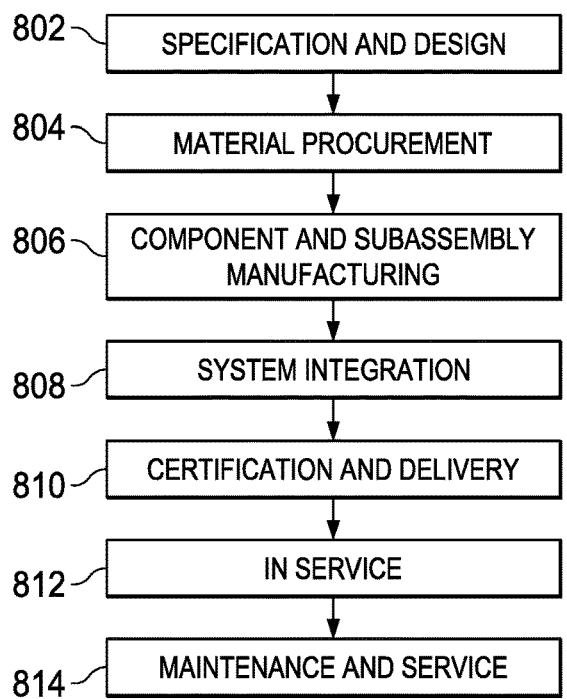
FIG. 8 is an illustration of an aircraft manufacturing and service method in the form of a block diagram in accordance with an illustrative embodiment.
Figure 9:
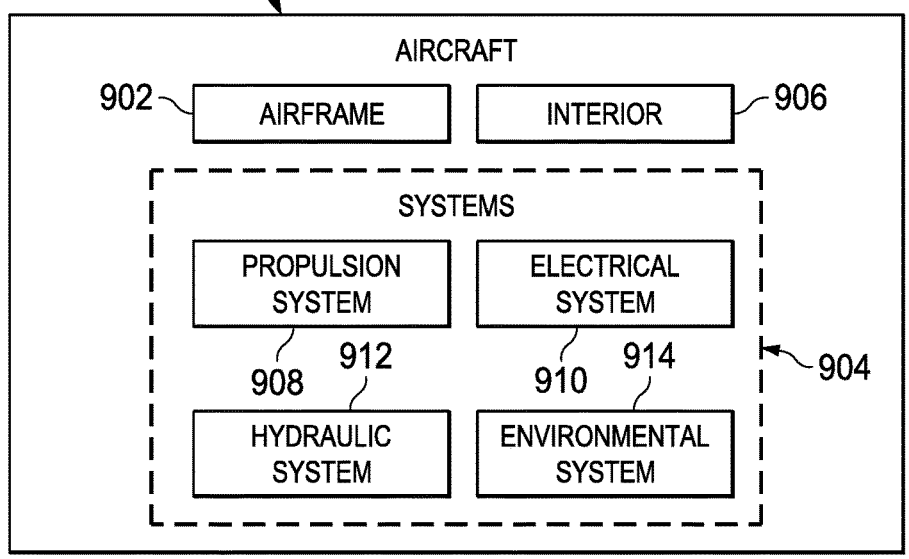
FIG. 9 is an illustration of an aircraft in the form of a block diagram in which an illustrative embodiment may be implemented.

Illustrative embodiments of the disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8. One or more illustrative embodiments may be used during component and subassembly manufacturing 806. For example, sensor 208 in FIG. 2 may be installed relative to a primary fastener and a secondary fastener during component and subassembly manufacturing 806. Further, measurement 226 from sensor 208 is used to determine if primary fastener 212 should be replaced during maintenance and service 814.

The illustrative embodiments provide a method and apparatus for determining a status of a fastener. More specifically, the illustrative embodiments provide a method and apparatus for determining if a primary fastener is still functioning.

A method to assess the integrity of a structure is presented. A sensor such as a strain gauge or Linear Variable Differential Transformer (LVDT) sensor is placed along a structural link between dual fasteners. In some examples, the structural link is a tension link. The load is carried through the structural link between the primary fastener and the connector during normal conditions. The secondary fastener is non-load bearing except in the case of a primary fastener not functioning properly. The sensor reading taken between the primary and secondary fasteners will be indicative of which fastener is carrying the load, further indicating primary fastener malfunction if the secondary fastener is loaded.

Readings from a sensor may be compared to readings from other sensors. For example, when the fastener status detection system is installed on an aircraft, such as on flight control surfaces, the readings can be compared between the left and the right wing, and between supports common to a flight control surface to confirm the drop in strain is due to primary fastener malfunction.

When integrity of the primary fastener is compromised, a sensor, such as a sense line, detects a non-loaded portion value. The value may be predetermined or compared to another duplicate mechanism on the other side of the aircraft. In some examples, a measurement between 0 and a little under half of a loaded value may indicate a non-loaded portion between the primary fastener and the secondary fastener. Any known method (electrical signal, wireless, etc.) can be used to transfer the measurement to the maintenance log. The maintenance crew, during routine check, can determine if the primary fastener is functioning by checking the value in their maintenance log. Checking a maintenance load may be at least one of less difficult or less time-consuming than checking conventional detection methods such as spring-loaded doors.

The disclosed fastener status detection system may save weight on an aircraft. For example, a sensor, such as sensor 208 in FIG. 2, may weigh less than a mechanical detection system such as a spring-loaded window. Further, the disclosed fastener status detection system may produce a cost savings. For example, the disclosed fastener status detection system may reduce maintenance costs by reducing false positive failure results. The disclosed fastener status detection system also has increased reliability over conventional mechanical detection systems.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fastener status detection system that comprises:
   a connector that extends through a first end of a structural link;
   a primary fastener that extends through a second end of the structural link, such that the primary fastener carries a load, in the structural link, oriented parallel to a load path between a center axis of the primary fastener and a center axis of the connector;
   a secondary fastener that extends through the second end of the structural link and located along the load path; and
   at least a portion of a sensor positioned between:
      a first line, substantially perpendicular to both: the load path and to the center axis of the primary fastener, that intersects the center axis of the primary fastener; and
      a second line, substantially perpendicular to both: the load path and to a center axis of the secondary fastener, that intersects the center axis of the secondary fastener, the sensor configured to take a measurement of at least a portion of the load between the primary fastener and the secondary fastener.

2. The fastener status detection system of claim 1, wherein the sensor is positioned substantially parallel to the load.

3. The fastener status detection system of claim 1, wherein the secondary fastener does not carry the load when the primary fastener remains functional.

4. The fastener status detection system of claim 1 further comprising: a first component joined to the structural link by the primary fastener and the secondary fastener, wherein the primary fastener and the secondary fastener are pins.

5. The fastener status detection system of claim 1, wherein the sensor comprises at least one of: a strain gauge or a linear variable differential transformer.

6. The fastener status detection system of claim 1 further comprising: a processor located on a vehicle.

7. The fastener status detection system of claim 1, further comprising:
   the sensor being a first sensor and the measurement being a first measurement;
   a second sensor positioned to take a second measurement of at least a portion of a second load; and
   a processor programmed to:
      determine a difference between the first measurement and a standard; and
      responsive to an exceedance of a threshold value for the difference between the first measurement and the standard:
         provide an alert; and
         confirm the first measurement based upon the second measurement; and
         responsive to a lack of a confirmation of the first measurement by the second measurement, prevent the alert.

8. A method for determining a fastener status, the method comprising:
   extending a connector through a first end of a structural link;
   extending a primary fastener through a second end of the structural link, such that the primary fastener carries a load, in the structural link, oriented parallel to a load path between a center axis of the primary fastener and a center axis of the connector;
   extending a secondary fastener through the second end of the structural link and located along the load path;
   positioning at least a portion of a sensor between:
      a first line that intersects, substantially perpendicular to both: the load path, and to the center axis of the primary fastener; and
      a second line, substantially perpendicular to both: the load path, and to a center axis of the secondary fastener, that intersects the center axis of the secondary fastener;
   generating, using only the sensor, a measurement of at least the portion of the load; and
   determining a difference between the measurement and a standard.

9. The method of claim 8 further comprising: determining if the difference between the measurement and the standard is greater than a threshold; and sending an alert if the difference between the measurement and the standard is greater than the threshold.

10. The method of claim 8, further comprising the secondary fastener extending through the structural link and wherein positioning the sensor comprises: attaching the sensor to the structural link.

11. The method of claim 8 further comprising: determining if the difference between the measurement and the standard is greater than a threshold; and determining a difference between the measurement and a second measurement from a second sensor positioned to measure at least a portion of a second load between a second primary fastener and a second secondary fastener if the difference between the measurement and the standard is greater than the threshold.

12. The method of claim 8 further comprising: determining a difference between the measurement and a second measurement from a second sensor positioned to measure at least a portion of a second load between a second primary fastener and a second secondary fastener.

13. The method of claim 12 further comprising: determining if the difference between the measurement and the second measurement is over a threshold; and sending an alert if the difference between the measurement and the second measurement is over the threshold.

14. The method of claim 8, further comprising:
   the sensor being a first sensor and the measurement being a first measurement;
   positioning a second sensor taking a second measurement of at least a portion of a second load; and
   a processor:
      determining the difference between the first measurement and the standard; and
      responsive to an exceedance of a threshold value for the difference between the first measurement and the standard:
         providing an alert;
         checking, using the second measurement, the first measurement; and
         responsive to lacking a confirmation of the first measurement by the second measurement, preventing the alert.

15. An assembly configured to detect a fastener status, such that the assembly comprises:
   a connector that extends through a first end of a structural link;
   a first component connected to a second end of the structural link using a primary fastener and a secondary fastener, such that the primary fastener carries a load, in the structural link, oriented parallel to a load path between a center axis of the primary fastener and a center axis of the connector, and such that the secondary fastener intersects the load path;

a second component connected to the first end of the structural link by the connector; and at least a portion of a sensor associated with the structural link and positioned between:
- a first line, substantially perpendicular to both: the load path, and to the center axis of the primary fastener, that intersects the center axis of the primary fastener; and
- a second line, substantially perpendicular to both: the load path and to a center axis of the secondary fastener, that intersects the center axis of the secondary fastener, the sensor configured to take a measurement of at least a portion of the load.

16. The assembly of claim 15, wherein the sensor is at least one of a strain gauge or a linear variable differential transformer.

17. The assembly of claim 15, wherein the sensor is positioned between the primary fastener and the secondary fastener.

18. The assembly of claim 15, wherein the load is at least one of tension or compression.

19. The assembly of claim 15, wherein the secondary fastener does not carry the load when the primary fastener is functioning.

20. The assembly of claim 15, further comprising:
the sensor being a first sensor and the measurement being a first measurement;
a second sensor positioned to take a second measurement of at least a portion of a second load; and
a processor programmed to:
  determine a difference between the first measurement and a standard; and
  responsive to an exceedance of a threshold value for the difference between the first measurement and the standard:
    provide an alert;
    confirm the first measurement based upon the second measurement; and
    responsive to a lack of confirmation of the first measurement by the second measurement, prevent the alert.

* * * * *